Patented June 22, 1937

2,084,500

UNITED STATES PATENT OFFICE 2,084,500

PRODUCTION OF SOLID GREASES

Michael Otto and Martin Mueller-Cunradi, Ludwigshafen-on-the-Rhine, Germany, assignors to I. G. Farbenindustrie Aktiengesellschaft, Frankfort-on-the-Main, Germany No Drawing. Application January 6, 1933, Serial No. 650,498. In Germany November 3, 1931

8 Claims. (Cl. 87—9)

This application is a continuation-in-part of our application Ser. No. 623,812, filed July 21st, 1932 according to which hydrocarbon mixtures, especially those having a boiling point above 325° C. at ordinary pressure, are considerably improved by adding thereto high molecular hydrocarbons having a molecular weight of for example 1000 or 2000 or even more, which are obtained by polymerizing iso-olefines and in particular isobutylene. These high molecular hydrocarbons are of great advantage for improving lubricating greases.

We have now found that also other polymerization products of unsaturated hydrocarbons capable of forming polymeric homologous series, and those products obtainable therefrom by hydrogenation or by isomerization, or by isomerization and hydrogenation, which have a high molecular weight of more than 800 and preferably of more than 2000, and which on heating to a temperature up to 200° C. for a period of 5 minutes, either alone or dissolved in a hydrocarbon oil do not undergo any appreciable decomposition, considerably improve the properties of lubricating greases when added thereto. Polymeric homologous compounds according to the definition suggested by Staudinger in "Zeitschrift für angewandte Chemie", Vol. 42, (1929) page 69 are those which are formed by polymerization of the same elementary molecule and which are different from each other only by the degree of polymerization but which for the rest have the same molecular structure. Examples of suitable hydrocarbons of the said nature are polymerized styrene, hydrogenated polymerized styrene, polymerized indene, hydrogenated rubber or hydrogenated polymerized diolefines, such as hydrogenated polymerized butadiene or isoprene, or polymerization products of isobutylene or other mono-olefines (having but one double linkage), such as iso-hexene, or of terpenes, cyclohexene or tetrahydronaphthalene, or cyclo-rubber or hydrogenated cyclo-rubber (see Chemical Review, Vol. 7, (1930), page 120; H. L. Fischer "The Chemistry of Rubber"), or mixtures of all these products. Hydrogenated polymerization products of diolefines and hydrogenated cyclo-rubber may be prepared by hydrogenating polymerization products of diolefines or cyclo rubber respectively under conditions similar to those employed in the hydrogenation of rubber. Polymerization products which can be produced with the aid of, for example, boron fluoride or aluminium chloride from isobutylene or other mono-olefines (having but one double linkage), such as iso-hexene or mixtures containing the same, at low temperatures, as for example 10° below zero C., are especially useful. By adding polymerization products of the aforesaid kind in quantities of from, say, 0.5 to about 25 per cent of the whole mixture, preferably from about 3 to about 10 per cent, solid lubricants are obtained having flattened temperature-viscosity curves in comparison to those of the mixture free from the polymerization products and which therefore have the advantage that even at temperatures, for example of 30° below zero C. or less the losses of power due to the internal friction of the lubricant are only slightly higher than at normal temperatures.

The solid lubricating greases prepared with the aid of the said polymerization products are considerably softer, tougher and more unctious than those made without the said additions; they are therefore eminently suitable as lubricants for automobile or differential gears and similar devices; the changing of a gear, for example, taking place very readily even at low temperature.

The lubricating greases to which the aforesaid polymerization products are added may be from any source. It has been found that the addition may be made with similar advantage to greases prepared in any desired manner. As specific examples of greases may be mentioned those obtained by saponifying vegetable or animal fats or oils with alkalies, alkaline earth or earths, such as aluminium oxide, or with lead oxide, or by saponifying Montan wax bleached in an oxidizing manner with the said basic substances. Also mixtures of the said saponified products may be satisfactorily employed. Specifically valuable greases are those obtained by mixing oily materials, such as mineral, tar, animal or vegetable oils or train oils or mixtures of these, with the saponification products of Montan wax which has been bleached by oxidizing treatment, or conversion products or mixtures thereof, as for example described in the British Patent No. 317,630. Since the saponification products of Montan wax bleached in an oxidizing manner also impart a particularly high dropping point to the solid lubricants prepared therewith, there is little danger of the lubricant flowing out even from bearings which are not very tight.

The amount of polymerization product and/or that of the Montan wax bleached in an oxidizing manner to be present in the lubricant may amount each up to 25 per cent or more depending on the purpose for which it is to be employed.

The following examples will further illustrate the nature of this invention but the invention is not restricted to these examples.

Example 1

500 kilograms of a machine oil having a viscosity of 7° Englar at 20° C. and a setting point of 35° below zero C. and which is obtained from Pennsylvanian mineral oil are mixed with 20 kilograms of Montan wax bleached in an oxidizing manner, 10 kilograms of a mixture of the calcium salts from the same wax and its ethylene glycol esters, 24 kilograms of a 10 per cent aqueous caustic soda solution and 25 kilograms of a product obtained from isobutylene by polymerization with boron fluoride at 10° below zero C., the mixture being kept at 100° C. for 6 hours while stirring. The resulting solid lubricant has great flexibility and adheres excellently to metals. It has a pour point of 93° C. and still lubricates quite satisfactorily at 35° below zero C.

Example 2

500 kilograms of a synthetic machine oil having a viscosity of 5.6° Engler at 50° C. and prepared by a polymerization with the aid of aluminium chloride of products from a cracking operation are stirred at 95° C. with 25 kilograms of a Montan wax bleached by oxidizing agents and with 30 kilograms of a 10 per cent aqueous caustic soda solution. 15 kilograms of a product obtained by the polymerization, at 20° below zero C., of a hexene, boiling at 50° C., with the aid of aluminium chloride, and the whole is stilled until all water present has been evaporated. A grease is obtained which has a pour point of 105° C., is very soft and smooth and adheres strongly to metal surfaces.

Instead of the polymerization product of hexene, polymerization products prepared from cyclohexene or turpentine oil may be employed whereby greases similar to that described above are obtained.

Example 3

300 kilograms of a machine oil having a viscosity of 4.5° Engler at 50° C. are stirred at 95° C. together with 18 kilograms of a Montan wax bleached by oxidizing agents and 20 kilograms of a 10 per cent aqueous caustic soda solution. After 6 hours a swelling of 6 kilograms of polymerized styrene in 50 kilograms of the same machine oil is added to the mixture, the whole then being stirred for an hour at the said temperature of 95° C. The resulting lubricating grease has a dropping point of 115° C. and is excellently soft and smooth.

Example 4

200 kilograms of a dark machine oil having a viscosity of 2.5° Engler at 99° C. are stirred for 6 hours at 95° C. together with 25 kilograms of a Montan wax bleached by oxidizing agents and 30 kilograms of a 10 per cent aqueous caustic soda solution. After the water has been completely evaporated a swelling of 5 kilograms of hydrogenated rubber in 50 kilograms of a machine oil having a viscosity of 4.5° Engler at 50° C. is added to the mixture the whole then being stirred for further 2 hours at 90° C. In this manner a grease is obtained having a dropping point of 135° C. which is suitable for lubricating heavy driving gears.

Example 5

100 kilograms of a machine oil having a viscosity of 4.5° Engler at 50° C. are stirred for 3 hours together with 16 kilograms of fused tallow and a solution of 1.6 kilograms of caustic soda and 2.6 kilograms of caustic lime in 20 liters of water in an autoclave at a temperature of 110° C. The water is then evaporated at 95° C. and under ordinary pressure. A swelling of 2 kilograms of hydrogenated rubber in 20 kilograms of the same machine oil is then added to the mixture whereupon the whole is stirred at 90° C. for 2 further hours. In this manner a grease is obtained which is excellently soft and smooth and which has a dropping point of 70° C.

What we claim is:—

1. A lubricating soap grease having incorporated therewith an addition of a hydrocarbon product having a high molecular weight above 800 which is selected from the group consisting of polymerization products of unsaturated hydrocarbons capable of forming polymeric homologous series and the products obtainable from said polymerization products by hydrogenation, by isomerization, and by isomerization and hydrogenation, and which is not decomposed when heated to 200° C. for 5 minutes.

2. A lubricating grease containing as main constituent a mixture of an oily material with a saponification product of Montan wax, and having incorporated therewith an addition of a hydrocarbon product having a high molecular weight above 800 which is selected from the group consisting of polymerization products of unsaturated hydrocarbons capable of forming polymeric homologous series and the products obtainable from said polymerization products by hydrogenation, by isomerization, and by isomerization and hydrogenation, and which is not decomposed when heated to 200° C. for 5 minutes.

3. A lubricating soap grease having incorporated therewith between 0.5 and 25 per cent of a hydrocarbon product having a high molecular weight above 800 which is selected from the group consisting of polymerization products of unsaturated hydrocarbons capable of forming polymeric homologous series and the products obtainable from said polymerization products by hydrogenation, by isomerization, and by isomerization and hydrogenation, and which is not decomposed when heated to 200° C. for 5 minutes.

4. A lubricating soap grease having incorporated therewith between 3 and 10 per cent of a hydrocarbon product having a high molecular weight above 800 which is selected from the group consisting of polymerization products of unsaturated hydrocarbons capable of forming polymeric homologous series and the products obtainable from said polymerization products by hydrogenation, by isomerization, and by isomerization and hydrogenation, and which is not decomposed when heated to 200° C. for 5 minutes.

5. An improved grease composition comprising a hydrocarbon lubricating oil, soap and from .5 to 25% of a polymer of isobutylene having a molecular weight above 1,000.

6. An improved grease composition comprising a hydrocarbon lubricating oil, soap and from .5 to 25% of a polymer of isobutylene having a molecular weight above 2,000.

7. A grease composition comprising a hydrocarbon oil, soap and hydrogenated rubber.

8. Composition according to claim 7 in which the hygronated rubber is in proportion from .5 to 25%.

MICHAEL OTTO.
MARTIN MUELLER-CUNRADI.